(12) United States Patent
Mensch et al.

(10) Patent No.: US 11,032,883 B2
(45) Date of Patent: Jun. 8, 2021

(54) DIMMER SYSTEM

(71) Applicant: Siemens Schweiz AG, Zürich (CH)

(72) Inventors: Johann Mensch, Regensburg (DE); Jakob Reislhuber, Mötzing (DE)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 16/643,945

(22) PCT Filed: Aug. 9, 2018

(86) PCT No.: PCT/EP2018/071632
§ 371 (c)(1),
(2) Date: Mar. 3, 2020

(87) PCT Pub. No.: WO2019/048175
PCT Pub. Date: Mar. 14, 2019

(65) Prior Publication Data
US 2020/0413504 A1 Dec. 31, 2020

(30) Foreign Application Priority Data
Sep. 6, 2017 (DE) ............ 10 2017 215 643.0

(51) Int. Cl.
*H05B 45/18* (2020.01)
*H05B 33/08* (2020.01)
*H05B 39/04* (2006.01)

(52) U.S. Cl.
CPC ............ *H05B 45/18* (2020.01); *H05B 33/08* (2013.01); *H05B 39/04* (2013.01)

(58) Field of Classification Search
CPC ........ H05B 45/18; H05B 45/10; H05B 45/28; H05B 33/08; H05B 39/04
See application file for complete search history.

(56) References Cited

U.S. PATENT DOCUMENTS 7,471,051 B1 * 12/2008 Wacknov ............. H05B 47/185
315/291
8,040,076 B2 10/2011 Schwarz ................ 315/291
(Continued)

FOREIGN PATENT DOCUMENTS

CN 101502182 A 8/2009
CN 204836682 U 12/2015
(Continued)

OTHER PUBLICATIONS

International Search Report and Written Opinion, Application No. PCT/EP2018/071632, 19 pages, dated Oct. 15, 2018.
(Continued)

*Primary Examiner* — Daniel D Chang
(74) *Attorney, Agent, or Firm* — Slayden Grubert Beard PLLC

(57) ABSTRACT

Various embodiments may include a dimmer system for controlling the power consumption of a load that can be connected with parallel-connected galvanically isolated dimming channels. The dimmer system may include a plurality of dimming channels, each dimming channel including a sensor for monitoring a temperature of associated switch elements; and a control unit for each dimming channel, the control units configured to shift a respective dimming edge based at least in part on the temperature to distribute power dissipation of the connected load substantially equally across the plurality of dimming channels.

9 Claims, 4 Drawing Sheets

(56) References Cited

U.S. PATENT DOCUMENTS

2009/0267523 A1* 10/2009 Phillips .................. H05B 45/22
                                                         315/152
2013/0328505 A1   12/2013 Sadwick et al. .............. 315/307
2016/0198541 A1*  7/2016 Tikkanen ............... H05B 45/00
                                                         315/201

FOREIGN PATENT DOCUMENTS

| DE | 102016209278 B3 | 8/1917 | ............ H05N 37/02 |
| DE | 102008030365 A1 | 8/2009 | ............ B60Q 1/00 |
| EP | 2925095 A1 | 9/2015 | ............ H05B 37/02 |
| KR | 101568752 B1 | 1/2015 | |
| WO | 2019/048175 A1 | 3/1919 | ............ H05B 33/08 |

OTHER PUBLICATIONS

Chinese Office Action, Application No. 201880057930.7, 6 pages, dated Apr. 25, 2021.

\* cited by examiner

DIMMER SYSTEM

CROSS-REFERENCE TO RELATED APPLICATIONS

This application is a U.S. National Stage Application of International Application No. PCT/EP2018/071632 filed Aug. 9, 2018, which designates the United States of America, and claims priority to DE Application No. 10 2017 215 643.0 filed Sep. 6, 2017, the contents of which are hereby incorporated by reference in their entirety.

TECHNICAL FIELD

The present disclosure relates to dimmer systems. Various embodiments may include systems for controlling the power consumption of a load that can be connected to a dimmer system, wherein the dimmer system comprises at least two parallel-connected galvanically isolated dimming channels.

BACKGROUND

Dimmers, dimming devices, and/or dimming systems for controlling brightness are used for varying the power of a light facility. A power variation of this type can be effected by controlling phase cut-in or controlling phase cut-out. In the case of controlling phase cut-in the current is switched on after a delay following the zero crossing of the ac voltage and flows until the next zero current crossing. Conversely in the case of controlling phase cut-out the current is switched on immediately after the zero crossing and switched off again before the next zero crossing.

In particular as a result of the widespread use of LED technology so-called multichannel dimmer systems are known, in which a master dimmer has multiple power levels (slave dimmer, channels), which can be connected in parallel on the output side for an increase in power. In the case of these high-power dimmers multiple physical channels (slaves) are connected in parallel and a high-power logical channel is created. In the case of this parallel connection it is very important that the outputs switch simultaneously. If two channels have been connected in parallel and the second channel switches too late (in the case of phase cut-in) or too early (in the case of phase cut-out) the first channel is overloaded. This results in excessive heating and then derating or switching-off of the logical channel, with both physical channels being affected in this case. Any potentially necessary equipment replacement will lead to costs and disruption for the customer.

SUMMARY

The teachings of the present disclosure describe low-maintenance and powerful dimmer systems for phase-synchronous switching of multiple parallel dimming channels. For example, some embodiments include a dimmer system (DS) for controlling the power consumption of a load (L) that can be connected, in particular an LED lamp, with at least two parallel-connected galvanically isolated dimming channels (DK_A, DK_B, DK_X), wherein each dimming channel (DK_A, DK_B, DK_X) comprises a device (TS1-TS3) for monitoring the temperature of its switch elements, and wherein each dimming channel (DK_A, DK_B, DK_X) comprises a control unit (SE1-SE3) for shifting its dimming edge according to the temperature (T) of its switch elements, in order to distribute the power dissipation of the connected load (L) substantially equally to the dimming channels (DK_A, DK_B, DK_X).

In some embodiments, the respective dimming edge of the respective dimming channel (DK_A, DK_B, DK_X) is shifted forward or backward in time by the control unit of the respective dimming channel (DK_A, DK_B, DK_X) depending on the temperature of the respective switch elements.

In some embodiments, the time shift of the respective dimming edge forward or backward takes place until the temperature gradient of the respective switch elements decreases.

In some embodiments, the time shift of the respective dimming edge forward or backward takes place until the temperature of the respective switch elements stagnates.

In some embodiments, the time shift of the respective dimming edge forward or backward takes place until the temperature of the respective switch elements decreases.

In some embodiments, there is a master switch unit (MSE), which is connected for data purposes to the control units of the dimming channels (DK_A, DK_B, DK_X), wherein the master control unit (MSE) specifies a target value to the control units of the dimming channels (DK_A, DK_B, DK_X), wherein the respective shift of the dimming edges is based on the target value.

In some embodiments, the target value is based on the temperature of the switch elements incorporated in the dimmer system.

In some embodiments, the dimming channels (DK_A, DK_B, DK_X) are arranged on a shared cooling means (KM), in particular a cooling plate.

As another example, some embodiments include a method for controlling the power consumption of a load (L) that can be connected to a dimmer system (DS), in particular an LED lamp, wherein the dimmer system (DS) comprises at least two parallel-connected galvanically isolated dimming channels (DK_A, DK_B, DK_X), wherein a shifting of the dimming edge of the respective dimming channel (DK_A, DK_B, DK_X) occurs according to the temperature of the switch elements of the respective dimming channel (DK_A, DK_B, DK_X), in order to distribute the power dissipation of the connected load (L) substantially equally to the dimming channels (DK_A, DK_B, DK_X).

In some embodiments, the respective dimming edge of the respective dimming channel (DK_A, DK_B, DK_X) is shifted forward or backward in time depending on the temperature of the respective switch elements.

BRIEF DESCRIPTION OF THE DRAWINGS

The teachings herein and example embodiments thereof are further explained using the example of the figures below. These show.

DETAILED DESCRIPTION

Figure 1:
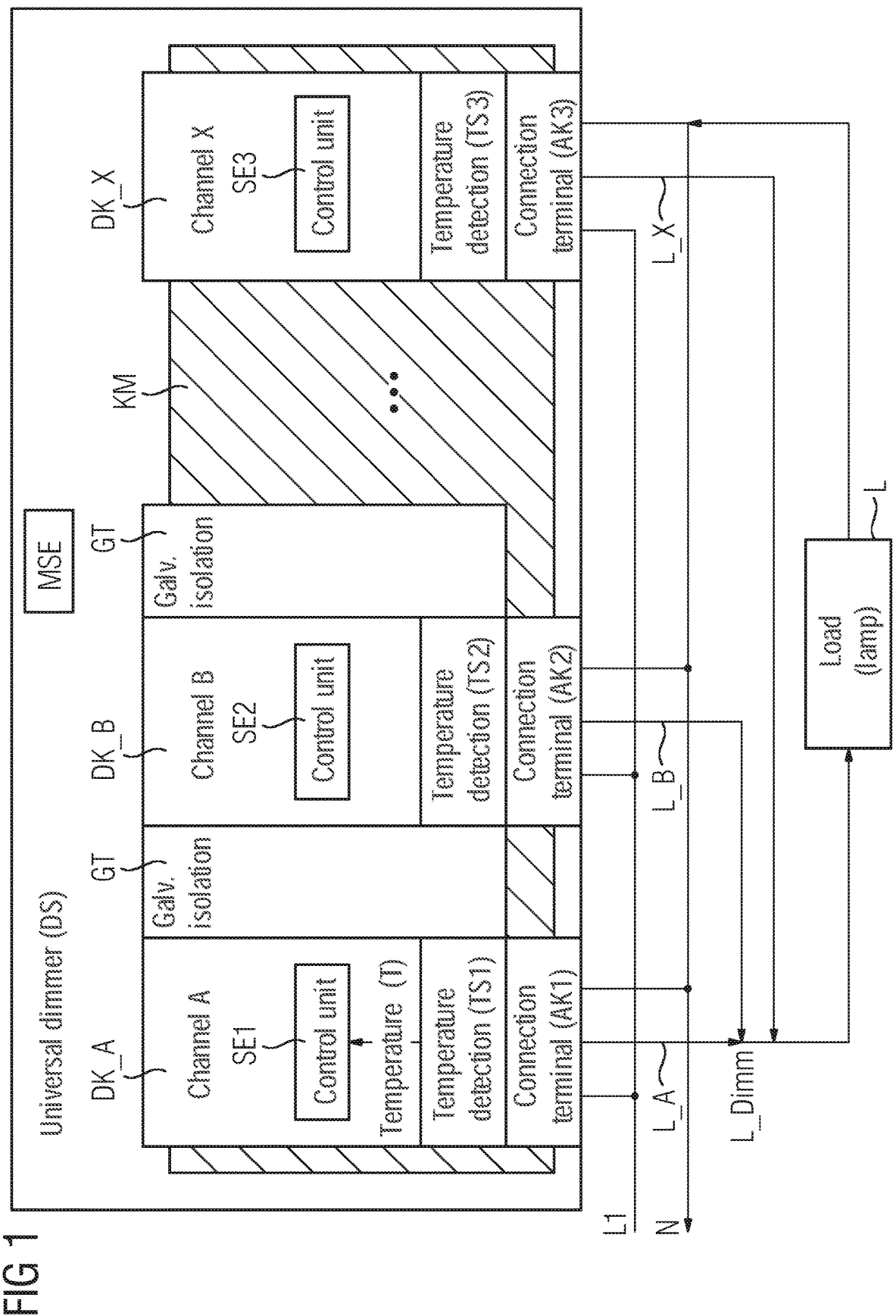
FIG. 1 An exemplary arrangement for a dimmer system with multiple parallel-connected galvanically isolated dimming channels incorporating teachings of the present disclosure, FIG. 2 An exemplary phase shift for phase cut-in incorporating teachings of the present disclosure, FIG. 3 An exemplary phase shift for phase cut-out incorporating teachings of the present disclosure, and FIG. 4 An exemplary flow diagram for carrying out an example method incorporating teachings of the present disclosure.

Various embodiments include a dimmer system for controlling the power consumption of a load that can be connected, in particular an LED lamp, with at least two parallel-connected galvanically isolated dimming channels, wherein each dimming channel comprises a device for monitoring the temperature of its switching elements, and wherein each dimming channel comprises a control unit for shifting its dimming edge according to the temperature of its switch elements, in order to distribute the power dissipation of the connected load substantially equally to the dimming channels. This may result in an improvement in the dimmability of large loads being operated in parallel. The quantity of channels that can be connected in parallel may be increased, which in turn makes it possible to support even larger loads. The dimmer system can be employed with greater versatility as a result. It is thus possible to provide a scalable dimmer system, depending on the respective requirements applicable to the lighting system and the respective load required for this. In some embodiments, the dimmer system has connection terminals for hooking up to an installation bus (e.g. a KNX bus system).

In some embodiments, the respective dimming edge of the respective dimming channel is shifted forward or backward in time by the control unit of the respective dimming channel depending on the temperature of the respective switch elements. To this end each dimming channel has a device (e.g. a temperature sensor that provides an electric signal depending on the captured temperature) with which it can monitor the temperature of its switch elements. If the temperature at the switch element rises it can be assumed that the channel is switching on too early (phase cut-in operation) or switching off too late (phase cut-out operation). Then the dimming edge is shifted in suitable steps forward (phase cut-out) or backward (phase cut-in operation) in time by the control unit until the temperature at the switch element is no longer rising so rapidly, stagnates, or even goes lower, depending on the temperature range applying.

In some embodiments, the time shift of the respective dimming edge forward or backward takes place until the temperature gradient of the respective switch elements decreases. The temperature gradient is a measure of the intensity or strength respectively of the change in temperature. The temperature gradient therefore indicates whether a dimming edge shift is, or respectively will be, successful.

In some embodiments, the time shift of the respective dimming edge forward or backward takes place until the temperature of the respective switch elements stagnates. Stagnation of the temperature of the respective switch elements is an indication that the time shift of the respective dimming edge is successful since no further temperature increase occurs.

In some embodiments, the time shift of the respective dimming edge forward or backward takes place until the temperature of the respective switch elements decreases. A decrease in the temperature of the respective switch elements is also an indication that the time shift of the respective dimming edge is successful.

In some embodiments, the dimmer system comprising a master switch unit, which is connected for data purposes to the control units of the dimming channels, wherein the master control unit specifies a target value to the control units of the dimming channels, wherein the respective shifting of the dimming edges is based on the target value. In general, the parallel galvanically isolated dimming channels each have their own circuits for phase synchronization.

However, due to component tolerances or because of aging of components, time differences can arise in the case of detecting zero crossing. These time differences then result in non-synchronous switching of the dimming channels.

In some embodiments, the dimming channels, or the respective control units of the dimming channels respectively, are controlled by a master control unit of the dimmer system. The master control unit knows the temperature values in the respective dimming channels and determines corresponding target values for the phase shift according to the temperature values. In some embodiments, the master control unit specifies a dedicated target value for a respective dimming channel.

In some embodiments, the target value may be based on the temperature of the switch elements incorporated in the dimmer system. The temperature of the incorporated switch elements can easily be determined, e.g. by means of semiconductor temperature sensors or by means of thermistors (NTC, PTC).

In some embodiments, the dimming channels may be arranged on a shared cooling means or cooling body respectively, in particular a cooling plate. The cooling power of the cooling means or cooling body respectively shared by all dimming channels can be used flexibly for carrying off or conducting away respectively the dissipated heat of the dimming channels employed in each case. Scaling of the quantity of dimming channels employed is therefore possible with the aid of a shared cooling means or cooling body respectively.

In some embodiments, there is a method for controlling the power consumption of a load that can be connected to a dimmer system, in particular an LED lamp, wherein the dimmer system comprises at least two parallel-connected galvanically isolated dimming channels, wherein a shifting of the dimming edge of the respective dimming channel occurs according to the temperature of the switch elements of the respective dimming channel, in order to distribute the power dissipation of the connected load substantially equally to the dimming channels. The inventive method enables a simple way of equally distributing the power dissipation of a connected load to the dimming channels used in a dimmer system. The temperature of the switching elements can be determined by means of digital temperature sensors or by semiconductor sensors respectively for example.

In some embodiments, the respective dimming edge of the respective dimming channel may be shifted forward or backward in time depending on the temperature of the respective switch elements. This results in synchronization of the dimming channels. In particular the respective dimming channel-specific zero crossings are synchronized.

LED technology is leading the way in the marketplace for lighting systems, and as a result the power requirements placed on dimming channels have decreased. Attempts are being made to accommodate, in the same constructional size, multiple channels, which admittedly support less power but as a result provide a higher level of flexibility and are optimized for LED lamps. If it is intended nevertheless to operate a load with greater power (e.g. a chandelier with incandescent bulbs) then for this purpose multiple channels can be connected in parallel to form a more powerful logical channel. This results in the load current being split across the parallel-connected channels and therefore power dissipation being equally distributed. This only functions if all channels switch on or off respectively at the same time. If not, then the current increases for one or more channels, which can be overloaded and switch off. The more channels connected together, the greater this issue becomes. With the example dimmer systems described herein, this problem may be prevented or reduced.

Dimmers or dimming devices are used for varying the power of a lighting device. A power variation of this type can be managed by controlling phase cut-in or controlling phase cut-out. In the case of controlling phase cut-in the current is switched on after a delay following the zero crossing of the ac voltage and flows until the next zero crossing. Conversely in the case of controlling phase cut-out the current is switched on immediately after the zero crossing and switched off again before the next zero crossing.

Conventional single dimmers mostly have a triac endstage and operate in phase cut-in mode. Triacs switch bi-directionally and are extinguished at zero current crossing. With the triac fired the input voltage for the lighting device (e.g. an LED lamp) is clamped to the prevailing value of the network voltage, so that no voltage exceeding the prevailing network voltage remains applied to the lighting device (e.g. an LED lamp). Since a triac is extinguished in the currentless state, no special circuit is required for detecting zero current crossing.

Moreover, so-called universal dimmers exist which, in the case of antiserially connected transistors (mostly MOSFETs), control both MOSFETs and therefore form a bi-directional switch that clamps the input voltage of the lighting device (e.g. an LED lamp) to the prevailing network voltage. However MOSFETs are not extinguished at zero current crossing like triacs. With these dimmers the zero current crossing has to be determined laboriously by way of a current measurement for example. As lighting devices therefore, LED lamps can be dimmed by using phase cut-in or phase cut-out. With so-called universal dimmers both phase cut-in and also phase cut-out are possible for dimming dimmable LED lamps (LED chip plus ballast unit).

FIG. 1 shows an exemplary arrangement for a dimmer system DS (e.g. a universal dimmer) incorporating teachings of the present disclosure for controlling the power consumption of a load L that can be connected (e.g. a lighting device), in particular an LED lamp, with at least two parallel-connected galvanically isolated dimming channels DK_A, DK_B, DK_X, wherein each dimming channel DK_A, DK_B, DK_X comprises a device TS1-TS3 for monitoring the temperature of its switch elements (e.g. components, transistors, cable), and wherein each dimming channel DK_A, DK_B, DK_X comprises a control unit SE1-SE3 for shifting its dimming edge, according to the temperature T of its switch elements, in order to distribute the power dissipation of the connected load L substantially equally to the dimming channels DK_A, DK_B, DK_X. The dimming channels DK_A, DK_B, DK_X are galvanically isolated (GT) or respectively galvanically decoupled between themselves in each case. The temperature monitoring can be effected by means of semiconductor temperature sensors for example.

In some embodiments, a control unit SE1-SE3 of a dimming channel DK_A, DK_B, DK_X is realized for determining a zero current crossing for phase cut-in control or phase cut-out control respectively (e.g. on the basis of the measured voltage). In some embodiments, a control unit SE1-SE3 is implemented by means of an integrated circuit (e.g. IC, microchip).

In some embodiments, the respective dimming edge of the respective dimming channel DK_A, DK_B, DK_X is shifted forward or backward in time by means of the control unit SE1-SE3 of the respective dimming channel DK_A, DK_B, DK_X depending on the temperature (T) of the respective switch elements (e.g. components, circuits, connections), in order to distribute the power dissipation of the connected load L (e.g. a lighting device) substantially equally to the dimming channels DK_A, DK_B, DK_X.

In some embodiments, the dimmer system DS has a master control unit MSE (e.g. a microcomputer or a microchip), which is connected for data purposes to the control units SE1-SE3 of the respective dimming channels DK_A, DK_B, DK_X, wherein the master control unit MSE specifies a target value to the control units SE1-SE3 of the respective dimming channels DK_A, DK_B, DK_X, wherein the respective shift of the dimming edges is based on the target value. The target value can be determined for example by evaluation of the temperature T measured in the dimming channels DK_A, DK_B, DK_X. The target value can be based for example on the temperature T of the switch elements incorporated in the dimmer system.

In some embodiments, the dimming channels DK_A, DK_B, DK_X are arranged on a shared cooling means KM, in particular a cooling plate or cooling body. The shared cooling means KM absorbs the dissipated heat of the dimming channels DK_A, DK_B, DK_X. This results in overheating of the dimming channels and the dimmer system being prevented.

The respective dimming channels DK_A, DK_B, DK_X have suitable connection terminals AK1-AK3 for connecting phase conductor L1, neutral conductor N, or the respective load output channels L_A, L_B, L_X. The load output channels L_A, L_B, L_X of the respective dimming channels DK_A, DK_B, DK_X are connected together in parallel on the output side to form the channel L_Dimm for connecting or respectively controlling the load L (e.g. an LED lamp or a group of LED lamps respectively). The connection to a supply voltage, e.g. a network voltage, is effected by way of phase conductor L1 and neutral conductor N.

The channel L_Dimm (output for connecting the load) therefore represents a controllable load path for the load (e.g. a lamp).

Figure 2:
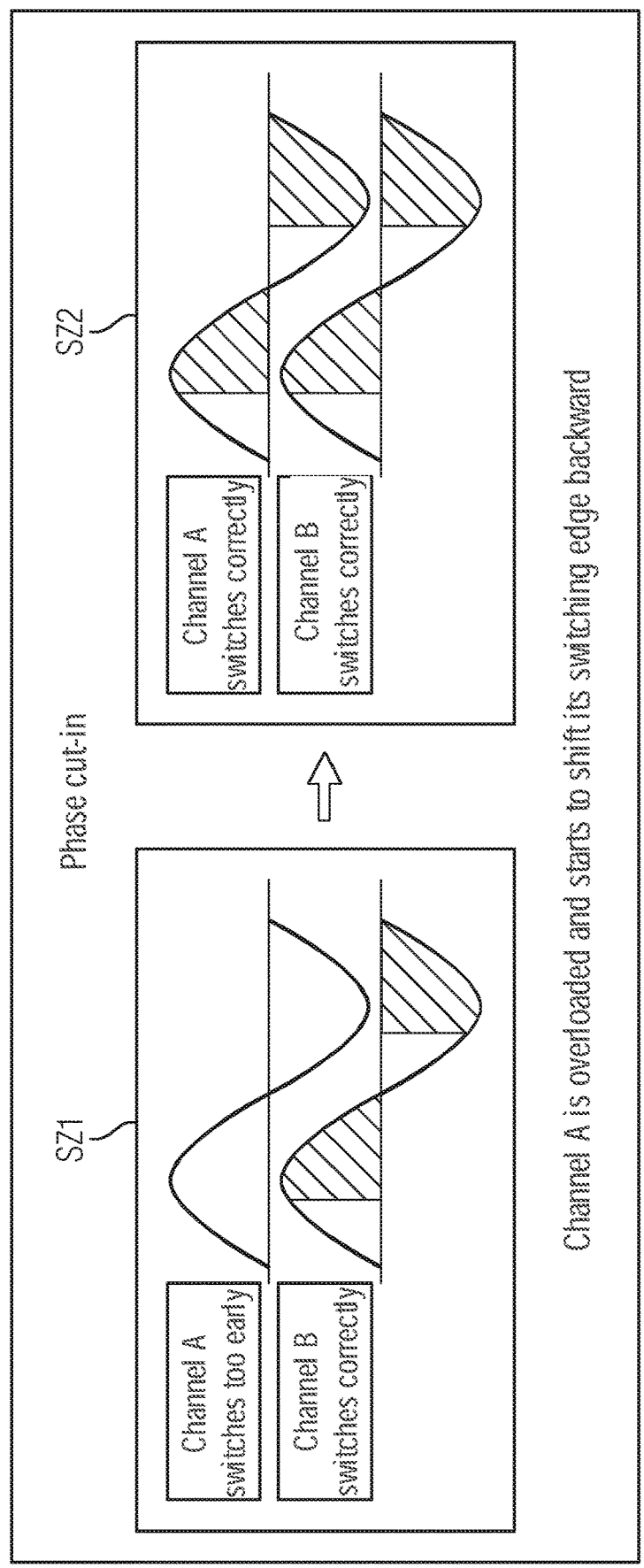

FIG. 2 shows an exemplary phase shift for phase cut-in. A curve for a network voltage or ac supply voltage respectively is represented as a sine wave for each dimming channel (channel A, channel B). In the case of phase cut-in operation, the load is controlled after a certain time delay from the preceding zero current crossing in each network half-wave. Each dimming channel (channel A, channel B) has a device with which it can monitor the temperature of its switch elements. If the temperature at the switch element rises, it can be assumed that the channel is switching on too early. In the left-hand scenario SZ1 of the exemplary diagram according to FIG. 2 channel A is switching too early. This is detected by the control unit of channel A (e.g. by corresponding temperature monitoring). The control unit of dimming channel A causes the dimming edge of channel A to be shifted backward in time (i.e. to the right in the diagram according to FIG. 2) depending on the temperature of the respective switch elements in dimming channel A (see scenario SZ2 of the exemplary diagram according to FIG. 2). In scenario SZ2 of the exemplary diagram according to FIG. 2 channel A and channel B switch synchronously again.

Figure 3:
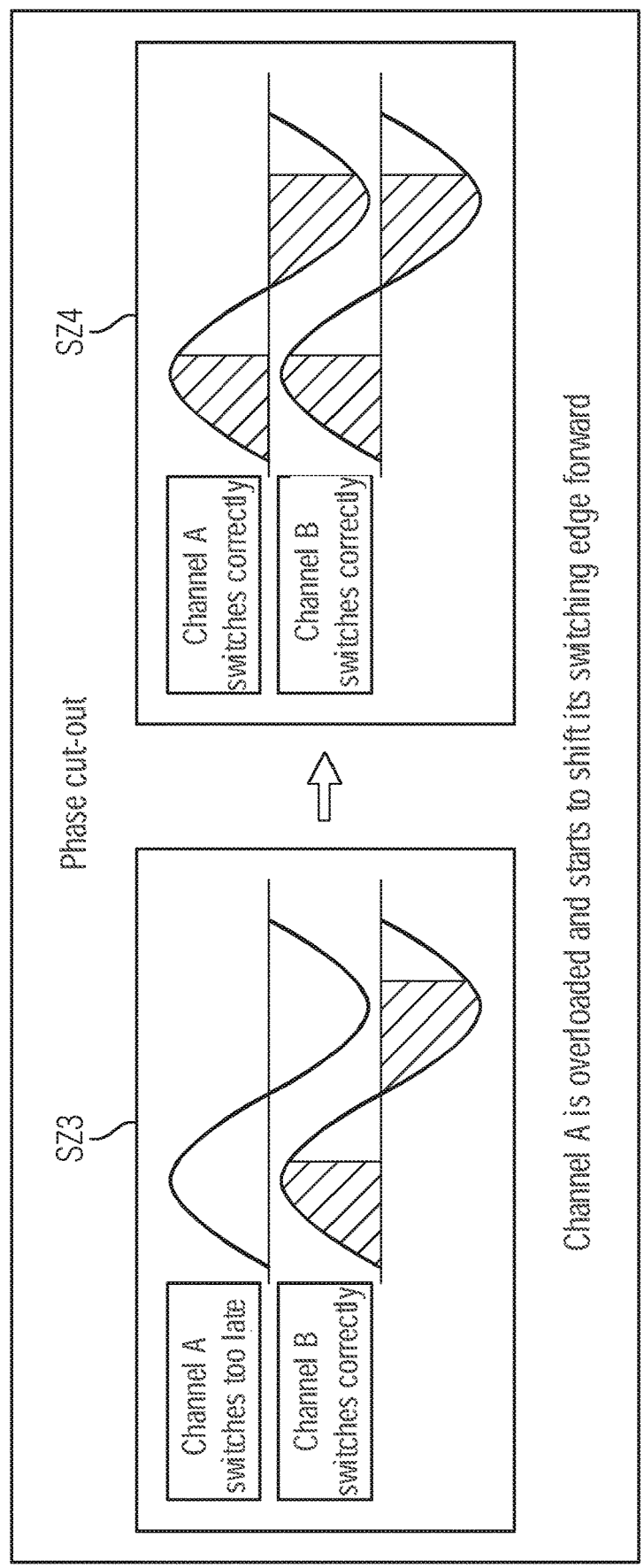

FIG. 3 shows an exemplary phase shift for phase cut-out. A curve for a network voltage or ac supply voltage respectively is represented as a sine wave for each dimming channel (channel A, channel B). In the case of phase cut-out operation, the load is switched on at network voltage zero crossing and switched off again after a certain delay in each network half-wave. Each dimming channel (channel A, channel B) has a device with which it can monitor the temperature of its switch elements. If the temperature at the switch element rises, it can be assumed that the channel is switching on too late. In the left-hand scenario SZ3 of the exemplary diagram according to FIG. 3 channel A is switching too late. This is detected by the control unit of channel A (e.g. by corresponding temperature monitoring). The control unit of dimming channel A causes the dimming edge of channel A to be shifted forward in time (i.e. to the left in the diagram according to FIG. 3) depending on the temperature of the respective switch elements in dimming channel A (see scenario SZ4 of the exemplary diagram according to FIG. 3). In scenario SZ4 of the exemplary diagram according to FIG. 3 channel A and channel B switch synchronously again.

Figure 4:
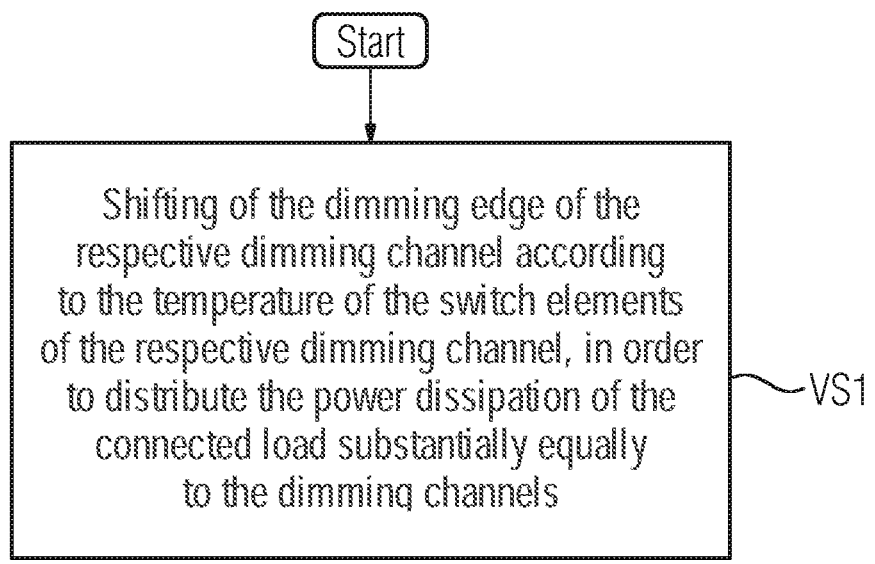

FIG. 4 shows a flow diagram for carrying out an example method for controlling the power consumption of a load that can be connected to a dimmer system, in particular an LED lamp, wherein the dimmer system (DS) comprises at least two parallel-connected galvanically isolated dimming channels (VS1) wherein a shifting of the dimming edge of the respective dimming channel occurs according to the temperature of the switch elements in the respective dimming channel, in order to distribute the power dissipation of the connected load substantially equally to the dimming channels.

In some embodiments, the respective dimming edge of the respective dimming channel is shifted forward or backward in time depending on the temperature of the respective switch elements. In some embodiments, the time shift of the respective dimming edge forward or backward takes place until the temperature gradient of the respective switch elements decreases.

In some embodiments, the time shift of the respective dimming edge forward or backward takes place until the temperature of the respective switch elements stagnates. In some embodiments, the time shift of the respective dimming edge forward or backward takes place until the temperature of the respective switch elements decreases.

Various embodiments of the methods herein can be implemented with commercially available components (e.g. semiconductor temperature sensors) or respectively with components (e.g. transistors, switch elements) that a dimmer system has in any event. A dimmer system and method for controlling the power consumption of a load that can be connected to a dimmer system, in particular an LED lamp, wherein the dimmer system comprises at least two parallel-connected galvanically isolated dimming channels, wherein a shifting of the dimming edge of the respective dimming channel occurs according to the temperature of the switch elements of the respective dimming channel, in order to distribute the power dissipation of the connected load substantially equally to the dimming channels.

REFERENCE SYMBOLS

DS Dimmer system
KM Cooling means
MSE Master control unit
DK_A, DK_B, DK_X Dimming channel
L Load
SE1-SE3 Control unit
T Temperature
TS1-TS3 Temperature sensor
L1 Phase conductor
N Neutral conductor
L_A, L_B, L_X Load output channel
L_Dimm Output for connecting the load
SZ1-SZ4 Scenario
VS1 Method step

What is claimed is:

1. A dimmer system for controlling the power consumption of a load that can be connected with parallel-connected galvanically isolated dimming channels, the system comprising:
a plurality of dimming channels, each dimming channel including a sensor for monitoring a temperature of associated switch elements; and
wherein each dimming channel comprises an associated control unit, wherein each control unit is configured to shift a respective dimming edge based at least in part on the temperature to distribute power dissipation of the connected load substantially equally across the plurality of dimming channels,
wherein a first control unit within a first dimming channel is further configured to shift the respective dimming edge of the first dimming channel forward or backward in time based at least in part on the temperature of the associated switch elements.

2. The dimmer system as claimed in claim 1, wherein the time shift continues until a temperature gradient of the associated switch elements decreases.

3. The dimmer system as claimed in claim 1, wherein the time shift continues until the temperature of the associated switch elements stagnates.

4. The dimmer system as claimed in claim 1, wherein the time shift continues until the temperature of the associated switch elements decreases.

5. The dimmer system as claimed in claim 1, further comprising a master switch unit connected for data purposes to the respective control units of the plurality of dimming channels;
wherein the master control unit specifies a target value to the respective control units of the plurality of dimming channels;
wherein the respective shift of the dimming edges is based on the target value.

6. The dimmer system as claimed in claim 5, wherein the target value is based on the temperature of the switch elements incorporated in the dimmer system.

7. The dimmer system as claimed in claim 1, wherein the dimming channels are arranged on a shared cooling means.

8. A method for controlling the power consumption of a load connected to a dimmer system, wherein the dimmer system comprises a plurality of parallel-connected galvanically isolated dimming channels and wherein each dimming channel comprises an associated control unit, the method comprising:
shifting a dimming edge of a respective dimming channel by the associated control unit based at least in part on a temperature of associated switch elements of the respective dimming channel, in order to distribute power dissipation of the connected load substantially equally across each of the dimming channels,
wherein the respective dimming edge of a first dimming channel is shifted forward or backward in time by a first control unit of the first dimming channel based at least in part on the temperature of the associated switch elements.

9. The method as claimed in claim 8, wherein the respective dimming edge of the respective dimming channel is shifted forward or backward in time depending on the temperature of the associated switch elements.

* * * * *